US005766268A

United States Patent [19]
Bruhnke

[11] Patent Number: 5,766,268
[45] Date of Patent: Jun. 16, 1998

[54] POLY(OXYALKYLENE)-SUBSTITUTED COLORANT

[75] Inventor: John D. Bruhnke, Spartanburg, S.C.

[73] Assignee: Milliken Research Corporation, Spartanburg, S.C.

[21] Appl. No.: 816,084

[22] Filed: Mar. 13, 1997

[51] Int. Cl.$^6$ ................................................ C09B 69/10
[52] U.S. Cl. .................... 8/647; 8/543; 8/549; 8/648; 8/657; 8/661; 8/662; 8/675; 8/676; 8/677; 106/493; 106/498; 534/729; 540/122
[58] Field of Search .................... 8/647, 657, 661, 8/648, 662, 675, 676, 677, 543, 549; 106/493, 498; 534/573, 652, 689, 690, 692, 701, 706, 729, 734, 751; 540/122

[56] References Cited

U.S. PATENT DOCUMENTS

| | | | |
|---|---|---|---|
| 3,157,633 | 11/1964 | Kuhn | 260/200 |
| 4,167,510 | 9/1979 | Brendle | 260/174 |
| 4,284,729 | 8/1981 | Cross et al. | 521/158 |
| 4,398,915 | 8/1983 | Panto et al. | 8/543 |
| 4,468,255 | 8/1984 | Schwartz et al. | 106/288 |
| 4,634,555 | 1/1987 | Baxter et al. | 540/126 |
| 4,640,690 | 2/1987 | Baumgartner et al. | 8/506 |
| 4,664,708 | 5/1987 | Allen | 106/22 |
| 4,703,113 | 10/1987 | Baxter et al. | 534/796 |
| 4,726,844 | 2/1988 | Greenwood | 106/22 |
| 4,732,570 | 3/1988 | Baumgartner et al. | 8/506 |
| 4,738,721 | 4/1988 | Baxter et al. | 106/22 |
| 4,777,248 | 10/1988 | Greenwood | 534/803 |
| 4,836,851 | 6/1989 | Pawlowski et al. | 106/22 |
| 4,871,371 | 10/1989 | Harris | 534/729 |
| 5,062,894 | 11/1991 | Schwartz et al. | 106/23 |
| 5,176,745 | 1/1993 | Moore et al. | 106/22 |
| 5,240,464 | 8/1993 | Kluger et al. | 8/506 |
| 5,250,708 | 10/1993 | Barry, Jr. | 549/226 |
| 5,270,363 | 12/1993 | Kluger et al. | 524/90 |
| 5,275,647 | 1/1994 | Winnik | 106/22 E |

FOREIGN PATENT DOCUMENTS

| | | |
|---|---|---|
| 0 176 195 | 4/1986 | European Pat. Off. . |
| 0 187 520 | 7/1986 | European Pat. Off. . |

*Primary Examiner*—Anthony Green
*Attorney, Agent, or Firm*—Terry T. Moyer; Timothy J. Monahan

[57] ABSTRACT

A colorant composition which can be liquid in the neat form at 25° C., having the structure ABXYZ, where A is an organic chromophore;

B is an electrophilic reactive group covalently bonded to A directly or through a linking group;

X is a nucleophilic linking group covalently bonding B and Y;

Y is a poly(oxyalkylene)-containing moiety comprising the formula $(C_aH_{2a}O)_m(C_bH_{2b}O)_n$ where a and b are different and from 1 to 8, m is at least 3, n is 0 to 15; and Z is a terminal group for Y.

The colorant composition can be prepared from a reactive dye AB which is reacted with XYZ, a poly(oxyalkylene)-containing moiety containing a nucleophilic group.

20 Claims, No Drawings

POLY(OXYALKYLENE)-SUBSTITUTED COLORANT

BACKGROUND OF THE INVENTION

This invention relates to a colorant having a poly (oxyalkylene) substituent, and in particular to a colorant made from a reactive dye having an electrophilic reactive group reacted with a poly(oxyalkylene) moiety having a nucleophilic reactive group.

Examples of colorants having polymeric substituents may be found in the following U.S. patents: Panto et al, U.S. Pat. No. 4,398,915 discloses a reactive dye coupled to a starch to form a water insoluble colorant for dyeing crepe paper; Allen, U.S. Pat. No. 4,664,708 discloses a reactive dye coupled to a polyethylenimine for use in an aqueous ink composition; and Pawlowski et al, U.S. Pat. No. 4,836,851 discloses a reactive dye coupled to a polyhydroxy substituent, such as sorbitol, for use in an aqueous ink composition.

Organic chromogens containing poly(oxyalkylene) substituents are disclosed in Kuhn, U.S. Pat. No. 3,517,633, Brendle, U.S. Pat. No. 4,167,510, Cross et al., U.S. Pat. No. 4,284,729, Baumgartner et al., U.S. Pat. No. 4,732,570, Moore et al., U.S. Pat. No. 5,176,745, Kluger et al., U.S. Pat. No. 5,240,464, and Barry, U.S. Pat. No. 5,250,708. Poly (oxyalkylene) substituted colorants made by modifying pigment are disclosed in Schwartz et al., U.S. Pat. No. 4,468,255.

Poly(oxyalkylene) substituted colorants have been employed in publication gravure printing inks (U.S. Pat. No. 5,062,894 to Schwartz et al.), and in aqueous ink compositions (U.S. Pat. No. 5,176,745 to Moore et al.). Winnik, U.S. Pat. No. 5,275,647 discloses a reactive dye coupled to a castor oil poly(oxyethylene) or polyethyleneimine surfactant to form a micelle for use in ink compositions.

Wu Rongrui et al., "Synthesis and Properties of Chemically Dyed Poly(ethylene oxide)" Acta Polymerica 39 (1988) Nr. 7, pp. 372–375) discloses treating polyethylene glycol (oxygen reacted nucleophiles) having a molecular mass of 4000 to 6000 with dyes having active dye groups such as mono- and dichlorotriazine or halogenalkylsulphamide to form a water-soluble precipitate.

Several patents and published applications assigned to ICI relate to poly(alkylene oxide)-substituted reactive dyes:

Baxter et al, U.S. Pat. No. 4,634,555 discloses a reactive phthalocyanine having a triazine function which may be reacted with an amine having poly(oxyalkylene) groups $(C_aH_{2a}O)_m(C_bH_{2b}O)_n$ where a and b are different and from 1 to 8, and m=1 to 10 and n=0 to 9, suited for use in an aqueous ink composition.

Baxter et al, U.S. Pat. No. 4,703,113 discloses a reactive azo dye made from a triazine-substituted coupling component reacted with a moiety having poly(oxyalkylene) groups $(C_aH_{2a}O)_m(C_bH_{2b}O)_n$ where a and b are different and from 1 to 8, and m=1 to 10 and n=0 to 9, suited for use in an aqueous ink composition.

Greenwood et al, U.S. Pat. No. 4,726,844 discloses an azo dye having a triazine function bonded which may be reacted with an amine having poly(oxyalkylene) groups $(C_aH_{2a}O)_m(C_bH_{2b}O)_n$ where a and b are different and from 1 to 8, and m=1 to 10 and n=0 to 9, suited for use in an aqueous ink composition.

Baxter et al, U.S. Pat. No. 4,738,721 discloses a reactive triphendioxazinylene having a triazine function which may be reacted with an amine having poly(oxyalkylene) groups $(C_aH_{2a}O)_m(C_bH_{2b}O)_n$ where a and b are different and from 1 to 8, and m=1 to 10 and n=0 to 9, suited for use in an aqueous ink composition.

Greenwood, U.S. Pat. No. 4,777,248 discloses a reactive azo colorant having diazo component with triazine functionality which may be reacted with an amine having poly (oxyalkylene) groups $(C_aH_{2a}O)_m(C_bH_{2b}O)_n$ where a and b are different and from 1 to 8, and m=1 to 10 and n=0 to 9, suited for use in an aqueous ink composition.

EP-A 0176195 to Baxter et al. (ICI) discloses water soluble dyes free of cellulose reactive groups, which contain a triazine group substituted with poly(oxyalkylene) groups $(C_aH_{2a}O)_m(C_bH_{2b}O)_n$ where a and b are different and from 1 to 8, and m=1 to 10 and n=0 to 9.

EP-A 0187520 to Greenwood (ICI) discloses water soluble azo H-acid dyes free of cellulose reactive groups, which contain a triazine group mono- or di-substituted with poly(oxyalkylene) groups $(C_aH_{2a}O)_m(C_bH_{2b}O)_n$ where a and b are different and from 1 to 8, and m=1 to 10 and n=0 to 9.

The relatively low molecular weights of the poly (oxyalkylenes) required by the ICI art result in dyes which exhibit a high stain factor for many substrates. Moreover, the resulting dyes are solids which must be dissolved in a suitable solvent for most uses.

SUMMARY OF THE INVENTION

The present invention provides poly(oxyalkylene)-substituted colorants which are compatible with polar solvents, e.g., water- and methanol-soluble colorants. Moreover, the present invention colorants can be a neat liquid at 25° C. and are thus more readily miscible with polar liquid solvents used in coloring processes. This provides a distinct advantage over reactive dyes which are generally insoluble in methanol and less than 10% soluble in water. Being liquid, the colorants are easy to dispense and do not require any premixing of powders. Thus, the present invention liquid colorants are useful for applications where hazardous powdering or dusting conditions associated with the use of particulate colorants are to be avoided. Moreover, the present colorants can be used at high color concentrations without formation of undesired precipitates. The colorants can have a low staining factor and thereby reduce or eliminate staining on most hard surfaces, skin, fabrics, and equipment. Such colorants can often be cleaned up with cold water. The colorants of the present invention are especially suited for non-ink applications requiring a lower stain factor. For example, such applications include dyes for cleaning agents where it is desired that the dye not tint the items cleaned. The colorants of the present invention can be used over a wide pH range and are compatible with fragrances and preservatives, without complexing or destabilizing the resulting mixture. They are also compatible with most cationic, anionic, non-ionic and quaternary systems. Because these colorants make true solutions, not emulsions or dispersions, the resulting formulations are clear and brilliant in appearance.

The present invention relates to a colorant composition which is liquid in the neat form at 25° C., having the structure

ABXYZ, where

A is an organic chromophore;

B is an electrophilic reactive group covalently bonded to A directly or through a linking group;

X is a nucleophilic linking group covalently bonding B and Y, selected from the group consisting of NR, O, S, and 4-oxyanilino (—HN—Ph—O—); where R is selected from the group consisting of H, alkyl, aryl, and YZ;

Y is a poly(oxyalkylene)-containing moiety comprising the formula $(C_aH_{2a}O)_m(C_bH_{2b}O)_n$ where a and b are different and from 1 to 8, m is at least 3, and n is 0 to 15; and Z is a terminal group for Y, e.g., one selected from the group consisting of hydroxyl, alkyl, e.g., $C_1$ to $C_4$ alkyl, amino, amido, alkyl ester, e.g., acetyl, phenyl ester, alkyl ether, alkyl acetal, and BA where Y has a nucleophilic end group.

In another aspect, the present invention relates to a colorant composition having the structure

ABXYZ, where

A is an organic chromophore;

B is an electrophilic reactive group covalently bonded to A directly or through a linking group;

X is a nucleophilic linking group covalently bonding B and Y, selected from the group consisting of NR, O, S, and 4-oxyanilino (—HN—Ph—O—); where R is selected from the group consisting of H, alkyl, aryl, and YZ;

Y is a poly(oxyalkylene)-containing moiety comprising the formula $(C_aH_{2a}O)_m(C_bH_{2b}O)_n$ where a and b are different and from 1 to 8, m is at least 3, n is 0 to 15 inclusive, and Z is a terminal group of Y;

provided that i) in the case where A is selected from the group consisting of azo and phthalocyanine chromophores, X is NH, and Z is OH, then m is at least 11, and ii) in the case where A is an azo chromophore, X is O, Z is OH, and n is 0, then Y has a molecular weight of less than 4000.

DETAILED DESCRIPTION OF THE INVENTION

Without limiting the scope of the invention, the preferred embodiments and features are hereinafter set forth. Unless otherwise directed, all parts and percentages are by weight and conditions are ambient, i.e., one atmosphere pressure at 25° C. Unless otherwise specified, aliphatic hydrocarbons are from 1 to 12 carbon atoms in length.

All of the U.S. patents disclosed in this specification are incorporated herein by reference in their entirety.

The compounds of the present invention are colorants having a poly(oxyalkylene) polymer substituent. The colorant may be synthesized by the reaction of a reactive dye with the polymer through a linking group. Reactive dyes can be represented as AB and are those dyes comprising an organic chromophore component A which is covalently bonded directly or through a linking group, such as an amino-containing group, to an electrophilic functional group B capable of reacting with a nucleophile to form a covalent bond either by addition or displacement.

A broad range of reactive dyes has been synthesized and includes those incorporating: azo groups such as monoazo, bisazo, and polyazo including their complexes with Cr, Fe, Co, and Cu; phthalocyanine; anthraquinone; aza [18] annulene; formazan copper complex; triphenodioxazine; nitroso; nitro; diarylmethane; triarylmethane; xanthene; acridene; methine; thiazole; indamine; azine; oxazine; thiazine; quinoline; indigoid; indophenol; lactone; aminoketone; hydroxyketone; and stilbene chromophores. Preferably, the reactive dye incorporates an azo, phthalocyanine or anthraquinone chromophore group.

The reactive dye moieties AB contain organic chromophore A and at least one electrophilic functional group B. When multiple functional groups are provided, it is often desirable that the groups vary in reactivity, to maximize conversion. Examples of electrophilic functional groups which may be incorporated into the reactive dye include: monohalotriazine; dihalotriazine; monohalopyrimidine; dihalopyrimidine; trihalopyrimidine; dihaloquinoxaline; dihalopyridazone; dihalophthalazine; halobenzothiazole; mono-(m-carboxypyridinium)-triazine; amino epoxide; methylamino; sulfatoethyl sulfone; sulfatoethyl sulfonamide; chloroethyl sulfone; vinyl sulfone; phenylamino sulfone; acrylamide; alpha-haloacryloylamide; alpha, beta-dihalopropionyl amide; halosulfonyl pyrimidine; sulfatoethylamino sulfone; sulfatopropionamide; halosulfothiazinylamide and haloacetylamide. The halo component may be selected from fluorine, chlorine and bromine. Preferably, the reactive dye incorporates an electrophilic functional group selected from monochlorotriazine, monofluorotriazine, dichlorotriazine, sulfatoethyl sulfone, vinyl sulfone, 2,3-dichloroquinoxaline, and 2,4-difluor-5-chloropyrimidine groups.

Reactive dyes meeting the above description are commercially available, described in the Colour Index, 3rd Edition, the Society of Dyers and Colourists (1971) and in the available published literature. By way of example and not limitation, the following reactive dyes may be employed: C.I. Reactive Black 5, C.I. Reactive Blue 2, C.I. Reactive Blue 4, C.I. Reactive Blue 5, C.I. Reactive Blue 7, C.I. Reactive Blue 15, C.I. Reactive Blue 19, C.I. Reactive Blue 27, C.I. Reactive Violet 3, C.I. Reactive Violet 5, C.I. Reactive Red 2, C.I. Reactive Red 24, C.I. Reactive Orange 4, C.I. Reactive Orange 13, C.I. Reactive Orange 16, C.I. Reactive Orange 78, C.I. Reactive Yellow 3, C.I. Reactive Yellow 13, C.I. Reactive Yellow 14, C.I. Reactive Yellow 17, and C.I. Reactive Yellow 95.

The poly(oxyalkylene)-containing substituent Y is covalently bonded to the electrophilic group B of reactive dye AB through X, a nucleophilic linking group selected from the group consisting of NR, O, S, and 4-oxyanilino (—HN—Ph—O—); where R is selected from the group consisting of H, alkyl, aryl, and YZ. Two poly(oxyalkylene)-containing substituents may be bonded to reactive dye AB through a linking group comprising a trivalent atom, e.g., N. The number of poly(oxyalkylene) chains per chromophore may be from 1–6, preferably 1–4, most preferably 1, 2 or 3.

Y can be a poly(oxyalkylene)-containing moiety of the formula $(C_aH_{2a}O)_m(C_bH_{2b}O)_n$ where a and b are different and from 1 to 8, preferably from 1 to 4, e.g., a is 2, b is 3, m is at least 3, preferably at least 11, e.g., where lower staining factor of the resulting colorant composition is desired; n is 0 to 15 inclusive, e.g., 0. The molecular weight of the Y moiety can be less than 4000 and can range from 130 to 4000, preferably greater than 480 to less than 4000.

Typical of Y substituents are poly(oxyalkylene) polymers and copolymers. Polymeric substituents are preferred. In this regard, polyalkylene oxides and copolymers of same which may be employed to provide the colorant of the present invention are, without limitation, polyethylene oxides, polypropylene oxides, polybutylene oxides, copolymers of polyethylene oxides, polypropylene oxides and polybutylene oxides, and other copolymers including block copolymers, in which a majority of the polymeric substituent is polyethylene oxide, polypropylene oxide and/or polybutylene oxide. While such substituents generally have an average molecular weight in the range of from 130 to 4000, say, 130 to 1400, they should not be so limited.

The end group Z of poly(oxyalkylene)-containing substituent Y is not believed to be critical insofar as the functioning of the colorant is concerned. For example, Z can be a terminal group for Y selected from the group consisting of hydroxyl, alkyl, e.g., $C_1$ to $C_4$ alkyl, amino, amido, alkyl ester, e.g., acetyl, phenyl ester, alkyl ether, alkyl acetal, and BA where Y has a nucleophilic end group. The end group can itself contribute to solubility characteristics of the colorant product. Examples of other suitable terminal groups are those disclosed in U.S. Pat. No. 5,270,363 to Kluger, et al. for poly(oxyalkylene) polymers.

The solubility of the colorant composition of the present invention may be varied by the relative hydrophilic/oleophilic character of the poly(oxyalkylene) substituent and the end group, as well as the presence or absence of ionic groups on the organic chromophore. Preferably, the present colorant compositions are soluble in polar solvent, e.g., methanol and water. In particular, the present colorant compositions are greater than: 10%, 25%, 50%, or even 90% soluble in cold water.

The colorant compositions of the present invention can be readily prepared by covalently bonding reactive dye AB (as listed above) to the poly(oxyalkylene)-containing XYZ group by heating an aqueous composition of the copolymer and the dye to a temperature of at least 40° C., preferably at least 60° C. The reaction time will vary according to the temperature employed, i.e., increasing the temperature will increase the rate of reaction. For example, at 85° C., the reaction is complete in two hours. The pH of the reaction composition is maintained to avoid protonating amine if present in the reaction mixture. A molar excess of the poly(oxyalkylene)-containing group XYZ is typically employed to insure complete conversion and to minimize the presence of unreacted and unsubstituted reactive dye, which can cause undesired staining. Acid scavenger such as sodium carbonate is preferably present in the reaction mixture, say, in about equivalent amounts. The poly (oxyalkylene)- substituted colorant of the present invention formed in the reaction composition may be concentrated or diluted as desired for a particular application by evaporation or the addition of water, respectively.

Suitable examples of XYZ reactants from which the present colorant compositions can be prepared include commercially available polyoxyalkyleneamines from the JEFFAMINE® series available from Huntsman Chemical and described in Texaco Chemical Company, New Product Development brochures as the M, D, ED, DU, BuD, T, MNPA, and EDR series. These polyoxyalkylene amines contain primary amino groups attached to the terminus of a polyether backbone which can be based on either propylene oxide (PO), ethylene oxide (EO), or mixed EO/PO. The JEFFAMINE® family consists of monoamines, diamines and triamines, which are available in a variety of molecular weights, ranging from 230 to 6000. JEFFAMINE® compounds are designated by letter and number, the latter representing approximate molecular weight. JEFFAMINES® include M-Series (monoamines), D-Series (amine-terminated polypropylene glycols), ED-Series (polyether diamines based on a predominately polyethylene oxide backbone imparting water solubility), DU-Series (urea condensate of D-Series products to provide a diamine product of increased molecular weight which is amine terminated), BuD-Series (urea condensate of D-Series products to provide a urea terminated product), and T-Series (propylene oxide based triamines prepared by reacting PO with a triol initiator, followed by amination of the terminal hydroxyl groups). These amines are further described in U.S. Pat. No. 5,270,363 to Kluger et al., at columns 7 to 12. The present colorants may be used in inks, such as flexographic and gravure inks. Other applications include colorants for fabric softeners, laundry detergents, soaps, hard surface cleaners, antifreeze, and miscellaneous aqueous and non-aqueous liquids and pastes, in concentrations ranging from 0.001 to 10 wt %, preferably 0.01 to 5 wt %. Additionally, the colorants of the present invention can be used to color thermoplastic and thermoset resins as disclosed in U.S. Pat. No. 4,640,490 to Baumgartner et al. and U.S. Pat. No. 4,284,729 to Cross, et al.

The invention may be further understood by reference to the following examples, but is not intended to be construed as being unduly limited thereby.

EXAMPLES

General Reaction Conditions:

One equivalent of reactive dyestuff was mixed with about 5–10% molar excess of nucleophilic polymer, one equivalent of sodium carbonate (or other suitable acid scavenger), and enough water to afford mixing. The reaction mixture was then heated to 80°–100° C. for 2–4 hrs. and the resultant solution then phase separated. The concentrated polymeric colorant phase was then brought to a neutral pH and further diluted with water if desired.

Example 1

Fourteen gm of C.I. Reactive Blue 2 (60%) were mixed with 7.15 gm of Jeffamine® M-715, obtained from Huntsman (formerly Texaco Chemical Company), Bellaire, Tex., 0.5 gm of sodium carbonate, and 50 gm water. The mixture was heated to 85° C. for two hours. The concentrated polymeric colorant was phased from the salt phase and diluted with water.

Examples 2 to 15

The reagents set out in Table 1 below were mixed following Example 1's procedure.

TABLE 1

| Example # | Dyestuff | Polymer |
|---|---|---|
| 2 | C.I. Reactive Blue 2 | Jeffamine ® M-1000 |
| 3 | C.I. Reactive Blue 2 | Jeffamine ® ED-900 |
| 4 | C.I. Reactive Blue 19 | Jeffamine ® M-1000 |
| 5 | C.I. Reactive Orange 4 | Jeffamine ® M-1000 |
| 6 | C.I. Reactive Red 2 | Jeffamine ® M-1000 |
| 7 | C.I. Reactive Blue 15 | 4-poly(oxyethylene)oxyaniline |
| 8 | C.I. Reactive Violet 5 | Jeffamine ® M-715 |
| 9 | C.I. Reactive Violet 3 | Jeffamine ® M-715 |
| 10 | C.I. Reactive Blue 7 | Jeffamine ® M-715 |
| 11 | C.I. Reactive Black 5 | Jeffamine ® M-715 |
| 12 | C.I. Reactive Orange 13 | Jeffamine ® M-715 |
| 13 | C.I. Reactive Red 24 | Jeffamine ® M-715 |
| 14 | C.I. Reactive Blue 4 | Jeffamine ® M-715 |
| 15 | C.I. Reactive Blue 19 | Jeffamine ® M-715 |

Example 16

The colorant compositions of Examples 1 to 15 were tested for comparative staining abilities. The colorant to be tested was diluted with water to an absorptivity of 1 Abs/gm-cm/L. A 13-fiber test fabric, obtained from Test Fabrics Co. of Middlesex, N.J., was immersed into the colorant solution and allowed to soak for about 15 minutes. The test fabric was then air dried at least 12 hours. The test fabric was then rinsed with cold tap water until no bleeding of color occurred upon standing and then allowed to air dry. The delta E of the test fabric is measured on a Hunter Labscan available from Hunter Corporation, Reston, Va. before staining, after staining, and after washing. % Color washed out was calculated as the ratio of the difference in delta E after staining and after washing to the delta E after staining. The results (% Color Washed Out) are set out below in Table 2 and indicate that the colorant compositions of the present invention exhibit a utility as a fabric colorant for use with polar solvent. Color Washed Out ranges from 29% to 99% depending on the particular colorant and fabric tested.

NH, and Z is OH, then m is at least 11, and ii) in the case where A is an azo chromophore, X is O, Z is OH, and n is 0, then Y has a molecular weight of less than 4000.

4. The colorant composition of claim 3 wherein
A is selected from the group consisting of monoazo, bisazo, and polyazo including their complexes with Cr, Fe, Co, and Cu; phthalocyanine; anthraquinone; aza [18] annulene; formazan copper complex; triphenodioxazine; nitroso; nitro; diarylmethane; triarylmethane; xanthene; acridene; methine; thiazole; indamine; azine; oxazine; thiazine; quinoline; indigoid; indophenol; lactone; aminoketone; hydroxyketone; and stilbene chromophores;

B is selected from the group consisting of monohalotriazine; dihalotriazine; monohalopyrimidine; dihalopyrimidine; trihalopyrimidine; dihaloquinoxaline; dihalopyridazone; dihalophthalazine; halobenzothiazole;

TABLE 2

| Colorant | Acetate | SEF | Arnel | Cotton (Bleached) | Creslen 61 | Dacron 51 | Dacron 61 | Nylon 6,6 | Orlon 75 | Spun Silk | Polypropylene | Viscose | Wool |
|---|---|---|---|---|---|---|---|---|---|---|---|---|---|
| Example 1 | 92.00 | 98.20 | 97.90 | 81.00 | 97.50 | 96.70 | 97.00 | 91.20 | 98.10 | 56.00 | 98.20 | 69.90 | 88.70 |
| Example 2 | 92.70 | 99.00 | 98.90 | 81.50 | 98.90 | 98.20 | 98.60 | 93.50 | 99.00 | 58.80 | 97.00 | 69.80 | 90.70 |
| Example 3 | 93.40 | 99.20 | 98.90 | 80.00 | 99.30 | 98.50 | 98.90 | 94.00 | 99.40 | 63.30 | 99.40 | 73.40 | 91.20 |
| Example 4 | 91.60 | 97.90 | 96.70 | 95.00 | 97.40 | 95.40 | 97.10 | 81.90 | 97.70 | 45.70 | 97.30 | 97.10 | 81.00 |
| Example 5 | 96.50 | 98.30 | 97.00 | 75.70 | 98.30 | 97.50 | 97.30 | 97.20 | 97.20 | 57.80 | 96.70 | 71.70 | 93.20 |
| Example 6 | 94.80 | 97.80 | 97.60 | 71.00 | 97.90 | 98.30 | 98.40 | 97.90 | 97.90 | 35.50 | 97.80 | 70.20 | 86.20 |
| Example 7 | 97.40 | 95.70 | 97.20 | 77.70 | 95.80 | 96.20 | 96.00 | 86.90 | 94.20 | 56.80 | 96.70 | 79.00 | 81.00 |
| Example 8 | 99.20 | 99.50 | 97.60 | 97.50 | 98.50 | 99.50 | 99.20 | 98.80 | 98.70 | 45.10 | 98.30 | 93.70 | 82.90 |
| Example 9 | 99.10 | 98.80 | 96.90 | 95.10 | 98.90 | 98.70 | 99.20 | 98.59 | 99.00 | 61.30 | 98.30 | 89.40 | 93.00 |
| Example 10 | 99.30 | 99.40 | 98.90 | 73.70 | 99.20 | 98.80 | 98.70 | 97.80 | 99.00 | 64.90 | 98.80 | 77.80 | 95.70 |
| Example 11 | 97.90 | 96.20 | 99.40 | 94.60 | 98.10 | 98.80 | 97.30 | 99.00 | 96.50 | 66.40 | 99.30 | 88.30 | 93.00 |
| Example 12 | 99.30 | 99.70 | 99.50 | 77.50 | 99.30 | 99.80 | 98.70 | 97.50 | 99.40 | 65.20 | 98.70 | 77.80 | 87.80 |
| Example 13 | 99.00 | 99.10 | 99.20 | 92.30 | 98.20 | 98.30 | 98.10 | 97.80 | 98.80 | 29.20 | 96.70 | 87.00 | 68.80 |
| Example 14 | 78.60 | 97.60 | 89.70 | 91.50 | 98.20 | 97.10 | 95.40 | 81.10 | 97.30 | 62.60 | 95.80 | 93.90 | 84.20 |
| Example 15 | 90.90 | 97.90 | 97.80 | 97.80 | 98.40 | 98.00 | 96.80 | 76.60 | 97.90 | 49.40 | 97.90 | 97.50 | 82.70 |

There are, of course, many alternate embodiments and modifications which are intended to be included within the scope of the following claims.

It is claimed:

1. A colorant composition which is liquid in the neat form at 25° C., having the structure

ABXYZ, where
A is an organic chromophore;
B is an electrophilic reactive group covalently bonded to A directly or through a linking group;
X is a nucleophilic linking group covalently bonding B and Y, selected from the group consisting of NR, O, S, and 4-oxyanilino (—HN—Ph—O—); where R is selected from the group consisting of H, alkyl, aryl, and YZ;
Y is a poly(oxyalkylene)-containing moiety comprising the formula $(C_aH_{2a}O)_m(C_bH_{2b}O)_n$ where a and b are different and from 1 to 8, m is at least 3, n is 0 to 15; and
Z is a terminal group for Y.

2. The colorant composition of claim 1 wherein X is selected from the group consisting of NR, S and 4-oxyanilino, where R is selected from the group consisting of alkyl and YZ.

3. The colorant composition of claim 1 further providing that i) in the case where A is selected from the group consisting of azo and phthalocyanine chromophores, X is mono-(m-carboxypyridinium)-triazine; amino epoxide; methylamino; sulfatoethyl sulfone; sulfatoethyl sulfonamide; chloroethyl sulfone; vinyl sulfone; phenylamino sulfone; acrylamide; alpha-haloacryloylamide; alpha, beta-dihalopropionyl amide; halosulfonyl pyrimidine; sulfatoethylamino sulfone; sulfatopropionamide; halosulfothiazinylamide and haloacetylamide; and Z is a terminal group for Y selected from the group consisting of hydroxyl, alkyl, amino, amido, alkyl ester, phenyl ester, alkyl ether, alkyl acetal, and BA where Y has a nucleophilic end group.

5. The colorant composition of claim 4 wherein
A is selected from the group consisting of azo, phthalocyanine and anthraquinone chromophores;
B is selected from the group consisting of monochlorotriazine, dichlorotriazine, monofluorotriazine, 2,3-dichloroquinoxaline, 2,4-difluor-5-chloropyrimidine, sulfatoethyl sulfone, and vinyl sulfone;
a and b of Y are different and from 1 to 4; and
Z is selected from the group consisting of OH, $C_1$ to $C_4$ alkyl, acetyl, amino, and amido.

6. The colorant composition of claim 5 wherein
A is anthraquinone;
a for Y is 2, b for Y is 3; and
Z is selected from the group consisting of OH and amino.

7. The colorant composition of claim 1 wherein AB is a reactive dye moiety.

8. The colorant composition of claim 3 wherein AB is selected from the group consisting of C.I. Reactive Black 5, C.I. Reactive Blue 2, C.I. Reactive Blue 4, C.I. Reactive Blue 5, C.I. Reactive Blue 7, C.I. Reactive Blue 15, C.I. Reactive Blue 19, C.I. Reactive Blue 27, C.I. Reactive Violet 3, C.I. Reactive Violet 5, C.I. Reactive Red 2, C.I. Reactive Red 24, C.I. Reactive Orange 4, C.I. Reactive Orange 13, C.I. Reactive Orange 16, C.I. Reactive Orange 78, C.I. Reactive Yellow 3, C.I. Reactive Yellow 13, C.I. Reactive Yellow 14, C.I. Reactive Yellow 17, and C.I. Reactive Yellow 95; and Y has a molecular weight ranging from 130 to less than 4000.

9. A colorant composition which has the structure

ABXYZ, where

A is an organic chromophore;

B is an electrophilic reactive group covalently bonded to A directly or through a linking group;

X is a nucleophilic linking group covalently bonding B and Y, selected from the group consisting of NR, S, and 4-oxyanilino (—HN—Ph—O—); where R is selected from the group consisting of alkyl and YZ;

Y is a poly(oxyalkylene)-containing moiety comprising the formula $(C_aH_{2a}O)_m(C_bH_{2b}O)_n$ where a and b are different and from 1 to 8, m is at least 3, n is 0 to 15, and Z is a terminal group of Y.

10. A colorant composition which has the structure

ABXYZ, where

A is an organic chromophore;

B is an electrophilic reactive group covalently bonded to A directly or through a linking group;

X is a nucleophilic linking group covalently bonding B and Y, selected from the group consisting of NR, O, S, and 4-oxyanilino (—HN—Ph—O—); where R is selected from the group consisting of H, alkyl, aryl, and YZ;

Y is a poly(oxyalkylene)-containing moiety comprising the formula $(C_aH_{2a}O)_m(C_bH_{2b}O)_n$ where a and b are different and from 1 to 8, m is at least 3, n is 0 to 15, and Z is a terminal group of Y;

provided that i) in the case where A is selected from the group consisting of azo and phthalocyanine chromophores, X is NH, and Z is OH, then m is at least 11, and ii) in the case where A is an azo chromophore, X is O, Z is OH, and n is 0, then Y has a molecular weight of less than 4000.

11. The colorant composition of claim 10 wherein

A is selected from the group consisting of monoazo, bisazo, and polyazo including their complexes with Cr, Fe, Co, and Cu; phthalocyanine; anthraquinone; aza [18] annulene; formazan copper complex; triphenodioxazine; nitroso; nitro; diarylmethane; triarylmethane; xanthene; acridene; methine; thiazole; indamine; azine; oxazine; thiazine; quinoline; indigoid; indophenol; lactone; aminoketone; hydroxyketone; and stilbene chromophores;

B is selected from the group consisting of monohalotriazine; dihalotriazine; monohalopyrimidine; dihalopyrimidine; trihalopyrimidine; dihaloquinoxaline; dihalopyridazone; dihalophthalazine; halobenzothiazole; mono-(m-carboxypyridinium)-triazine; amino epoxide; methylamino; sulfatoethyl sulfone; sulfatoethyl sulfonamide; chloroethyl sulfone; vinyl sulfone; phenylamino sulfone; acrylamide; alpha-haloacryloylamide; alpha, beta-dihalopropionyl amide; halosulfonyl pyrimidine; sulfatoethylamino sulfone; sulfatopropionamide; halosulfothiazinylamide and haloacetylamide;

X is selected from the group consisting of 4-oxyanilino and NR, where R is selected from the group consisting of H, alkyl, aryl, and YZ;

Y is a poly(oxyalkylene)-containing moiety of the formula $(C_aH_{2a}O)_m(C_bH_{2b}O)_n$ where a and b are different and from 1 to 4, m ranges from 5 to 30; and Z is a terminal group for Y selected from the group consisting of hydroxyl, alkyl, amino, amido, acetyl, alkyl ester, phenyl ester, alkyl ether, alkyl acetal, and BA where Y has a nucleophilic end group.

12. The colorant composition of claim 11 wherein

A is selected from the group consisting of azo, phthalocyanine and anthraquinone chromophores;

B is selected from the group consisting of monochlorotriazine, dichlorotriazine, monofluorotriazine, 2,3-dichloroquinoxaline and 2,4-difluor-5-chloropyrimidine, sulfatoethyl sulfone and vinyl sulfone; and Z is a terminal group for Y, selected from the group consisting of hydroxyl, $C_1$ to $C_4$ alkyl, acetyl, and amino.

13. The colorant composition of claim 12 wherein m ranges from 5 to 10.

14. The colorant composition of claim 12 wherein m is at least 11.

15. The colorant composition of claim 12 wherein

A is anthraquinone;

B is selected from the group consisting of monochlorotriazine, sulfatoethyl sulfone, and vinyl sulfone;

Y is a poly(oxyalkylene)-containing moiety comprising the formula $(C_aH_{2a}O)_m(C_bH_{2b}O)_n$ where a is 2, b is 3; and Z is selected from the group consisting of OH and amino.

16. The colorant composition of claim 15 where n is 0.

17. The colorant composition of claim 10 wherein AB is a reactive dye moiety.

18. The colorant composition of claim 10 wherein AB is selected from the group consisting of C.I. Reactive Black 5, C.I. Reactive Blue 2, C.I. Reactive Blue 4, C.I. Reactive Blue 5, C.I. Reactive Blue 7, C.I. Reactive Blue 15, C.I. Reactive Blue 19, C.I. Reactive Blue 27, C.I. Reactive Violet 3, C.I. Reactive Violet 5, C.I. Reactive Red 2, C.I. Reactive Red 24, C.I. Reactive Orange 4, C.I. Reactive Orange 13, C.I. Reactive Orange 16, C.I. Reactive Orange 78, C.I. Reactive Yellow 3, C.I. Reactive Yellow 13, C.I. Reactive Yellow 14, C.I. Reactive Yellow 17, and C.I. Reactive Yellow 95.

19. The colorant composition of claim 10 wherein Y has a molecular weight of at least 130.

20. The colorant composition of claim 10 wherein Y has a molecular weight ranging from 130 to less than 4000.

* * * * *

UNITED STATES PATENT AND TRADEMARK OFFICE
CERTIFICATE OF CORRECTION

PATENT NO. : 5,766,268 Page 1 of 1
DATED : June 16, 1998
INVENTOR(S) : Bruhnke, John D.

It is certified that error appears in the above-identified patent and that said Letters Patent is hereby corrected as shown below:

<u>Columns 7 and 8,</u>
Line 22, after the number "61" delete "51" and insert -- 54 --, and after the number "51" delete "61" and insert -- 64 --.
Line 26, after the number "95.00" delete "9740" and insert -- 97.40 --.

Signed and Sealed this

Ninth Day of April, 2002

Attest:

Attesting Officer

JAMES E. ROGAN
Director of the United States Patent and Trademark Office